United States Patent

Holcomb et al.

[11] Patent Number: 5,926,005
[45] Date of Patent: Jul. 20, 1999

[54] CHARGER FOR BATTERIES AND FOR DEVICES HAVING BATTERIES

[75] Inventors: Jay R Holcomb, Waseca; Brian T Van Lear, Farmington, both of Minn.

[73] Assignee: Transcrypt International / E.F. Johnson Company, Burnsville, Minn.

[21] Appl. No.: 09/015,724

[22] Filed: Jan. 29, 1998

Related U.S. Application Data

[60] Provisional application No. 60/043,934, Apr. 21, 1997.
[51] Int. Cl.⁶ ..................................................... H02J 7/00
[52] U.S. Cl. ........................ 320/113; 320/107; D13/107
[58] Field of Search ..................................... 320/107, 110, 320/113, 114; 429/96, 99; D13/107

[56] References Cited

U.S. PATENT DOCUMENTS

| | | | |
|---|---|---|---|
| 3,579,075 | 5/1971 | Floyd | 320/110 |
| 4,009,429 | 2/1977 | Mullersman | 320/2 |
| 4,303,876 | 12/1981 | Kelly, III et al. | 320/110 |
| 4,558,270 | 12/1985 | Liautaud et al. | 320/2 |
| 4,645,995 | 2/1987 | Terrell et al. | 320/2 |
| 4,873,479 | 10/1989 | Timura et al. | 320/2 |
| 5,065,082 | 11/1991 | Fushiya | 320/2 |
| 5,233,281 | 8/1993 | Chiang et al. | 320/110 |
| 5,256,955 | 10/1993 | Tomura et al. | 320/110 |
| 5,280,229 | 1/1994 | Faude et al. | 320/110 |
| 5,365,159 | 11/1994 | Chen | 320/15 |
| 5,484,668 | 1/1996 | Kutz et al. | 291/121 |
| 5,592,064 | 1/1997 | Morita | 320/110 |
| 5,629,602 | 5/1997 | Makino | 307/66 |
| 5,818,197 | 10/1998 | Miller et al. | 320/107 |

*Primary Examiner*—Peter S. Wong
*Assistant Examiner*—Gregory J. Toatley
*Attorney, Agent, or Firm*—Schwegman, Lundberg, Woessner & Kluth, P.A.

[57] ABSTRACT

A battery charger is disclosed including a main housing which receives an adapter therein. The adapter receives batteries or other devices to be charged therein. The adapter has alignment projections and multiple levels therein for accommodating many different sizes of devices or batteries to be charged. In addition, the adapter is modular in that it can be modified yet still be received by the main housing for receiving additional devices of different sizes. The adapter seats with the main housing, and has integral attachment members for engaging a base plate thereto. Ventilation apertures are also provided within the main housing, the adapter, and the base plate for allowing sufficient heat dissipation during the charging process.

17 Claims, 5 Drawing Sheets

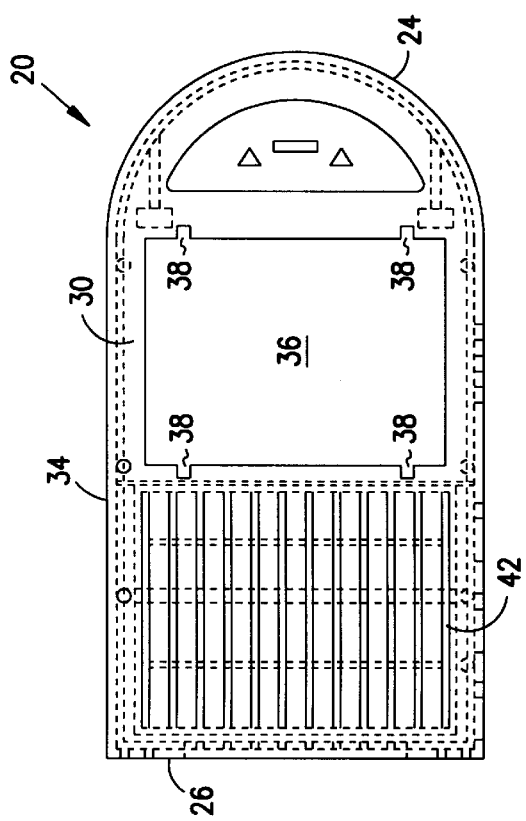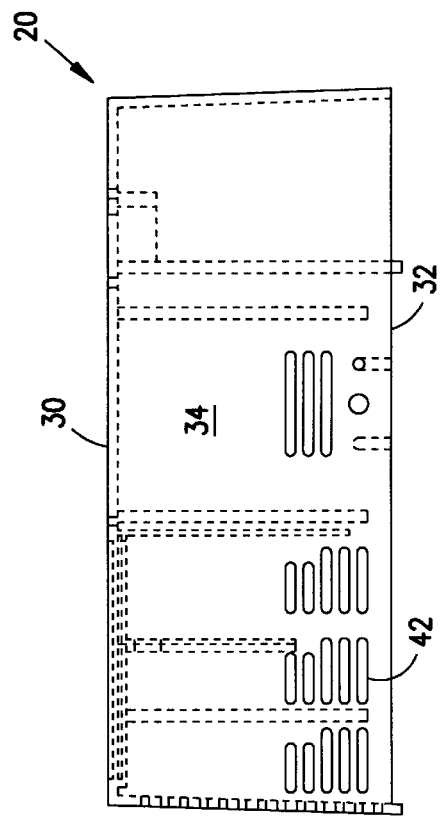

CHARGER FOR BATTERIES AND FOR DEVICES HAVING BATTERIES

This is a non-provisional utility patent application claiming the benefit of the filing date of U.S. Ser. No. 60/043,934, filed Apr. 21, 1997, entitled CHARGER FOR BATTERIES AND FOR DEVICES HAVING BATTERIES.

FIELD OF THE INVENTION

The present invention relates generally to battery chargers. More particularly, it pertains to battery chargers for recharging electronic devices, battery packs, and individual batteries.

BACKGROUND OF THE INVENTION

Wireless communication devices, including two-way radios and portable telephones, require some form of electrical power. Due to their portable nature and their use in remote areas, the electrical power is usually supplied by a battery. However, frequent replacement of used batteries with new batteries and the disposal of the used batteries can be expensive and harmful to the environment. Thus, wireless communication devices are often designed to be used with a rechargeable battery contained within a battery pack. The rechargeable batteries, which can be recharged after use, avoid the expense and inconvenience of repeatedly installing new batteries.

When rechargeable batteries become depleted, the battery is removed from the device and installed into a battery charger. Alternatively, the entire device, including the batteries, is installed into another battery charger. The charger contains all necessary power supply and control circuitry for bringing the battery up to full charge. One approach to charging batteries is U.S. Pat. No. 5,233,281 to Chiang et al., which relates to a replaceable cartridge type high speed nickel-cadmium battery charger.

One approach to charging batteries or the entire device including the batteries is U.S. Pat. No. 4,558,271 to Liautaud et al., which relates to a battery charging adapter for use with a battery operated transceiver. An adapter accommodates charging batteries separate from the transceiver.

One drawback of the Liautaud et al. battery charging system and the Chiang et al. battery charging system is the difficulty of charging both batteries installed in apparatus, as well as batteries contained in removable battery packs. Furthermore, adapters can become displaced from the main charging housing. Additionally, the main charging housing cannot accommodate additional varying sizes and shapes of the devices.

Another drawback of Chiang et al. battery system is the non-integral fasteners for assembling the battery chargers. In addition, heat dissipation is limited to holes on the left side of an upper surface of the upper cover. Excess heat generated during operation the charging assembly, without proper dissipation, can shorten the life of the electronic components.

Accordingly, what is needed is a better way to charge batteries installed in apparatus, as well as batteries contained in removable battery packs. What is further needed is a battery charger which can accommodate many different sized devices to be charged. What is also needed is a battery charger with sufficient heat dissipation.

SUMMARY OF THE INVENTION

The present invention provides a battery charger for charging batteries and devices having rechargeable batteries therein. The battery charger includes a main housing with charging circuitry, and an adapter electrically coupled with the charging circuitry. The adapter is disposed through the main housing and is secured with a base. A device to be charged is inserted in to the adapter where contacts extend through the adapter for connection with devices to be charged.

In one embodiment, the adapter has integral fasteners for securing the base to the battery charger. The fasteners are deflected while inserted into slots on the base, and released to engage flanges of the base. In another embodiment, the main housing, the adapter, and the base have ventilation apertures facilitating effective heat dissipation for the charging circuitry. Alternatively, in another embodiment, the adapter has at least one support surface, providing multiple levels within the adapter for placement of the devices to be charged. The levels provide different portions to accommodate batteries and/or devices to be charged with varying sizes.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claim, along with the full scope of equivalents to which such claim will be entitled.

BRIEF DESCRIPTION OF THE DRAWINGS

In the drawings, where like numerals describe like components throughout the several views:

FIG. 2a is top plan view illustrating a main housing of the battery charger constructed in accordance with one embodiment of the present invention.

FIG. 2b is a first side elevational view illustrating a main housing of the battery charger constructed in accordance with one embodiment of the present invention.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claim, along with the full scope of equivalents to which such claim will be entitled.

Figure 1:
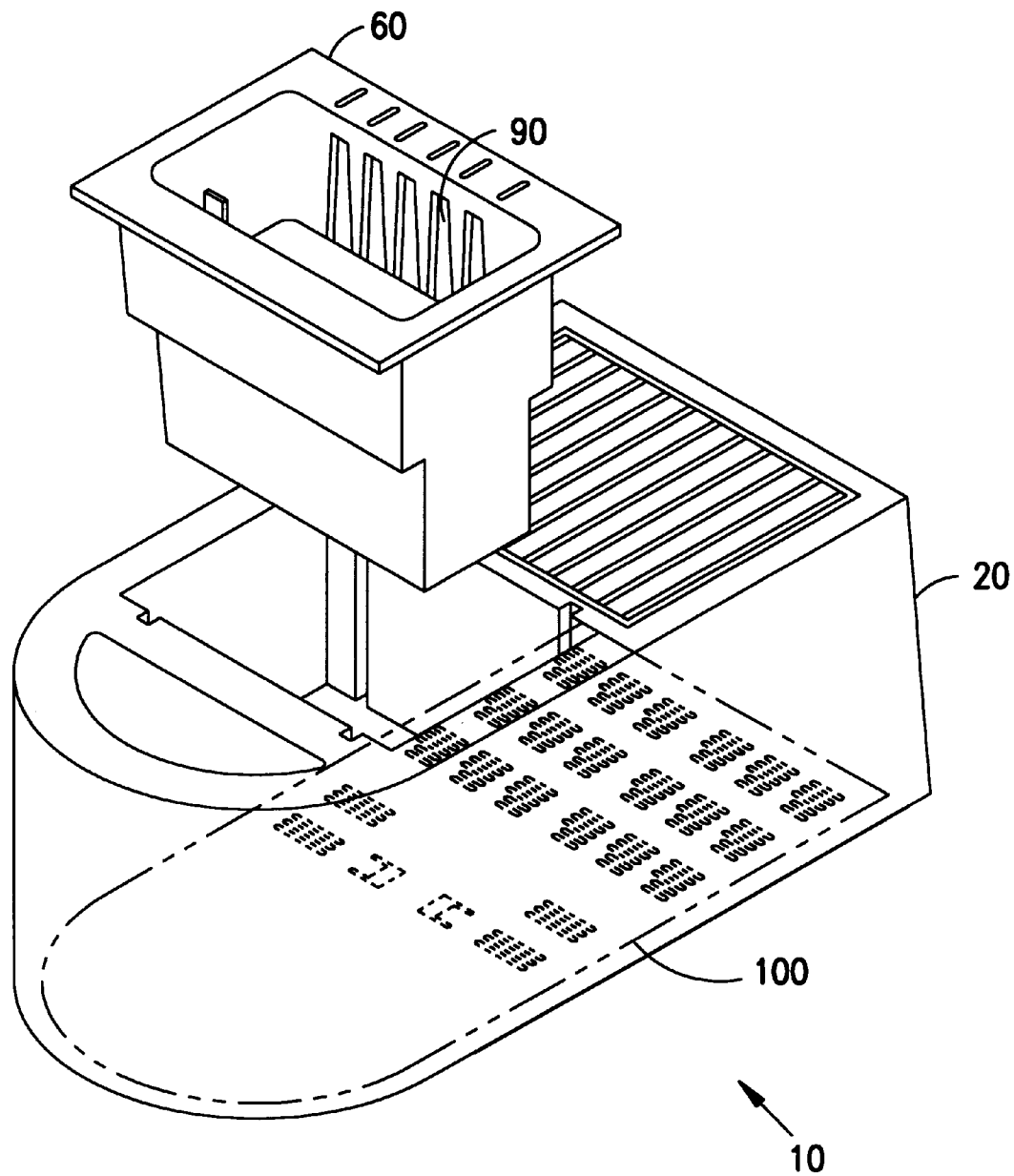
FIG. 1 is a perspective view of a battery charger constructed in accordance with one embodiment of the present invention.

The present invention provides a battery charger system for charging a device, such as a radio or a battery pack. A battery charger 10 is illustrated in FIG. 1. Generally, the battery charger 10 consists of a main housing 20, contacts (FIG. 4), an adapter 60, and a base plate 100. The main housing is shown in more detail in FIGS. 2a and 2b.

In one embodiment, the main housing 20 is shaped similar to rectangular box defined in part by a first surface 30, a second surface 32 and side surfaces 34, and extends from a first end 24 and a second end 26. In one embodiment, the first end 24 is rounded, as shown in FIG. 2a. The main housing 20 has a substantially hollow interior, where the housing 20 is open at the second surface 32.

The main housing 20 has a cut out 36 disposed within the first surface 30. In one embodiment, the cut out 36 is generally square shaped and is sized to receive the adapter 60 therein. Cut out 36 further has a plurality of seating cut outs 38. In another embodiment, the seating cut outs 38 are disposed in two opposite sides of the cut out. However, the cut outs 38 could take on a number of various positions, shapes, and sizes. The seating cut outs 38 engage with a portion of the adapter 60, as will be discussed further below.

Disposed in the first surface 30, the second end 26, and the side surfaces 34 of the main housing 20 are ventilation apertures 42. The ventilation apertures 42 are each shaped as an elongate slot, allowing heat to dissipate therethrough. Alternatively, other shapes for the ventilation apertures 42 could also be used. Although ventilation apertures 42 have been described, constructions providing heat dissipation for the internal components other than ventilation apertures, such as fins, can also be incorporated with the present invention.

In one embodiment, the main housing 20 is fabricated from plastic materials using injection molding, as is known by those skilled in the art. Alternatively, the main housing 20 is fabricated using other methods, or from other rigid materials, such as thermoplastic materials.

Figure 3A:
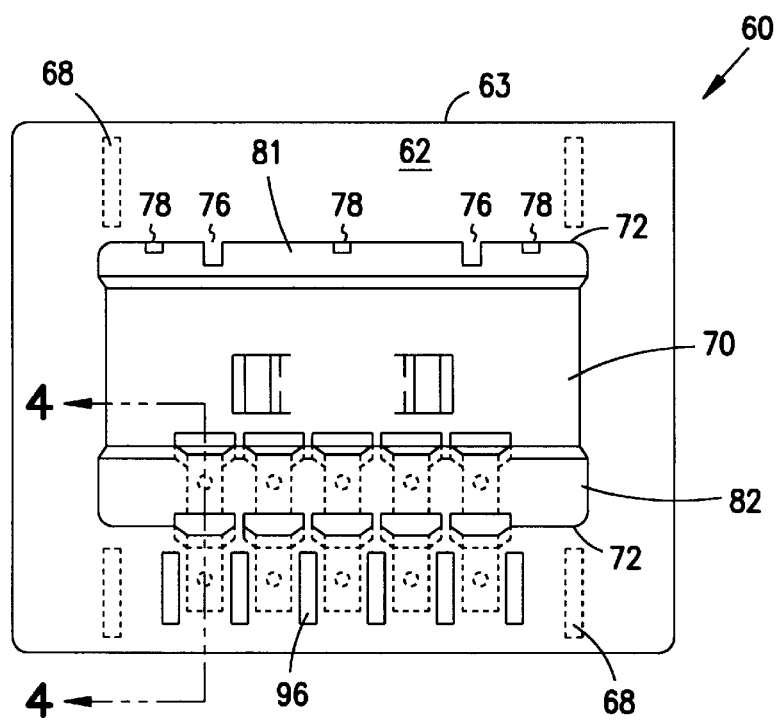
FIG. 3a is top plan view illustrating an adapter of the battery charger constructed in accordance with one embodiment of the present invention.
Figure 3B:
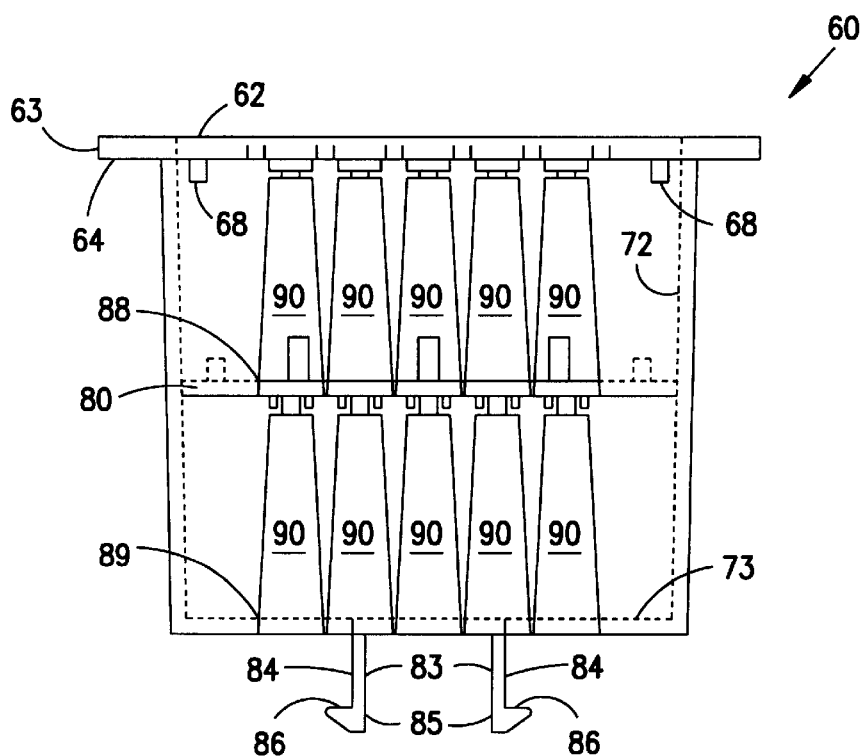
FIG. 3b is a first side elevational view illustrating an adapter of the battery charger constructed in accordance with one embodiment of the present invention.

Referring to FIGS. 3a and 3b, the adapter 60 is illustrated therein. The adapter 60 has a cut out 70, forming a general cup shape for receiving batteries or electronic devices therein. In one embodiment, the adapter 60 is shaped to receive rechargeable batteries therein. Alternatively, the adapter 60 receives a rechargeable radio therein. The cut out 70 is defined by side surfaces 72 and a bottom surface 73. The side surfaces 72 and the bottom surface 73 are labeled as side and bottom for descriptive purposes only, with such labels being arbitrary, and are not intended to limit the orientation of the battery charger 10 in any way. The adapter 60 is further defined, in part, by a mounting surface 62.

The mounting surface 62 has a ridge 63 which extends out away from the cut out 70. The ridge 63 around the perimeter of the mounting surface 62, and is for mating against the main housing 20 at the mating surface 64. The mating surface 64 has a plurality of mounting ribs 68 extending therefrom. The mounting ribs 68 are sized and positioned to be received by the seating cut outs 38 of the main housing 20, when the adapter 60 is seated therein. The mounting surface 62 also has a plurality of ventilation apertures 96 therein. In one embodiment, the ventilation apertures 96 comprise a plurality of slots disposed on one side of the mounting ridge 63.

Disposed within the cut out 70 are a plurality of projections for positioning devices received by the adapter 60. The plurality of projections include a first set of alignment projections 76 and a second set of alignment projections 78. The first set of alignment projections 76 are disposed on one of the side surfaces 72 of the cut out 70. The second set of alignment projections 78 are also disposed on one of the side surfaces 72 of the cut out 70. In one embodiment, the first and second set of alignment projections 76, 78 are disposed on the same surface of the side surfaces 72. Alternatively, the alignment projections 76, 78 each can be disposed on multiple side surfaces 72.

The cut out 70 further contains a supporting surface 80 therein for supporting electronic devices or batteries inserted into the cut out 70. In one embodiment, the supporting surface 80 provides the adapter 60 with a first level 88 and a second level 89. Alternatively, additional supporting surfaces can be provided for supplying additional levels. Two opposing side surfaces 72 are spaced apart a different amount at the first and second levels 88, 89. In one embodiment, two of the side surfaces 72 are spaced closer together at the second level 89 than at the first level 88. The variation in spacing of the side surfaces 72 at the different levels permit devices of varying sizes to be inserted into the battery charger 10 for re-charging.

The supporting surface 80 comprises a first and second ledge 81, 82 disposed on two of the side surfaces 72. In one embodiment, the first and second ledges 81, 82 are disposed on opposing side surfaces 72. Alternatively, the first and second ledges 81, 82 can be formed on adjacent side surfaces 72. Although the supporting surface 80 has been described having two ledges, the supporting surface 80 can include other constructions which provide support to devices inserted into the adapter 60.

The first ledge 81 is formed substantially transverse to one of the side surfaces 72. In addition, the first ledge 81 extends substantially across the entirety of one of the side surfaces 72. Alternatively, the first ledge 81 can be formed on a portion of one of the side surfaces 72. Preferably, the first ledge 81 is formed on the same side surface as the first and second set of alignment projections 76, 78. The first ledge extends out away from one of the side surfaces 72 further than the distance the alignment projections 76, 78 extend.

The cut out 70 of the adapter 60 extends to a depth defined by the bottom surface 73. The bottom surface 73 has attachment members 83 extending therefrom. Disposed in a central region of the bottom surface 73, the attachment members 83 include a set of resilient arms 84 extending out away from the cut out 70, and are disposed substantially parallel to each other. The resilient arms 84 each have a flat 86 formed thereon. The flats 86, in conjunction with the resilient arms 84, give the attachment members 83 a general L-shape. The flat 86 extends generally transverse to the resilient arms 84 from an end portion 85 of the arms 84. In one embodiment, each flat 86 extends away from the other in an opposite direction, as shown in FIG. 3b. The attachment members 83 are received by the base plate 100, as will be described further below.

The adapter 60 further comprises contact apertures 90 in one of the side surfaces 72. Each contact aperture 90 can be disposed within the same side surface. The first level 88 and the second level 89 each have a plurality of contact apertures 90. The number of contact apertures 90 depends on the application of the particular adapter 60, and can be varied accordingly. In one embodiment, five contact apertures are disposed at the first level 88, and five contact apertures are disposed at the second level 89. In another embodiment, the contact apertures 90 are disposed in the side surface directly opposite to the side surface containing the first and second set of alignment projections 76, 78 thereon. The contact apertures 90 are positioned and sized to receive the contacts 50 therethrough.

Similar to the first ledge 81, the second ledge 82 is formed substantially transverse to one of the side surfaces 72. Also similar to the first ledge 81, the second ledge 82 extends substantially across the entirety of one of the side surfaces 72. Alternatively, the second ledge 82 can be formed on a portion of one of the side surface. Preferably, the second ledge 82 is formed on the same side surface as the contact apertures 90. The second ledge 82 extends out away from one of the side surfaces 72 further than the distance the first ledge 81 extends from one of the side surfaces.

Figure 4:
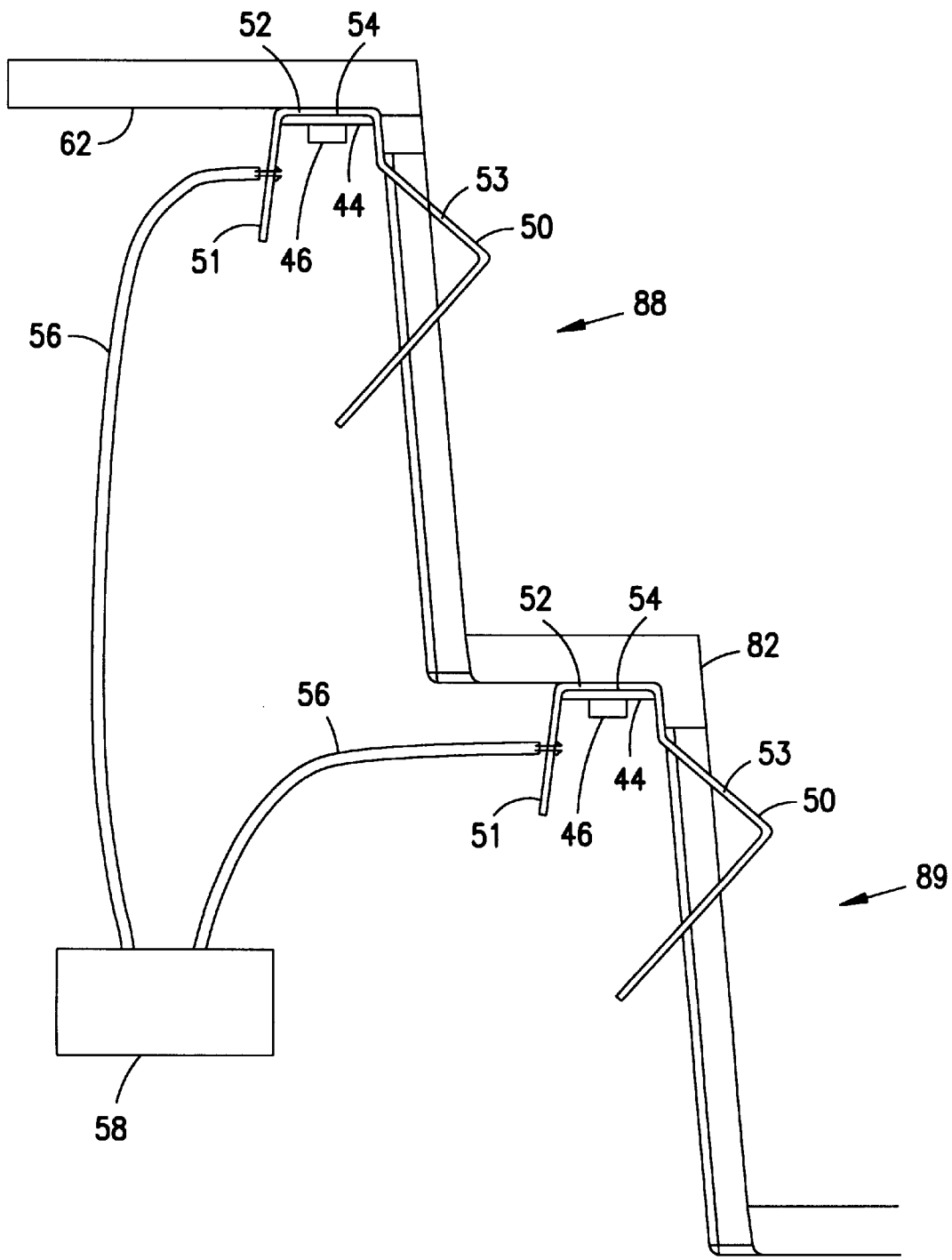
FIG. 4 is a partial cut-away view of FIG. 3a taken at section 4—4 of the adapter constructed in accordance with one embodiment of the present invention.

The contacts 50 provide the electrical connection between the battery charger 10 and the devices to be charged by the battery charger 10. The contacts 50, as illustrated in FIG. 4, include a structure formed into a multiple bend structure. The contacts 50 each have a soldering portion 51 connected with a fastening portion 52. The fastening portion 52 extends to a connection portion 53 which electrically contacts the devices to be charged. The connection portion 53 extends through the adapter 60, as will be further discussed below. The contacts 50 are fabricated from a mechanically resilient, electrically conductive material.

The adapter 60 has a fastener 44 for attaching the contacts 50 to the main housing 20. In one embodiment, the fastener 44 comprises a heat stake 46 for each contact 50 disposed on the mounting surface 62 and the supporting surface 80 of the main housing 20, providing contacts 50 at the first level 88. The heat stake 46 is also disposed on the second ledge 82 for fastening contacts 50 thereto at the second level 89. The fastening portion 52 of each contact 50 has a fastening aperture 54 therein. Each contact 50 is placed over the heat stake 46 such that the heat stake 46 is disposed through the fastening aperture 54. The heat stake 46 is thermally deformed over the fastening portion 52 of the contact 50, thereby securing the contact 50 to the adapter 60. Alternatively, the contact 50 is secured to, or integrally formed with, the adapter 60 using alternative measures such as clips.

The soldering portion 51 of the contacts 50 are electrically connected to a charging assembly 58 by a wire 56. The charging assembly 58 is electrically connected with a current source (not shown), such as an alternating current or a direct current, and provides the electrical charge to the batteries or electronic devices coupled with the contacts 50. Such a charging assembly is well known in the art and, therefore, will not be described in further detail herein.

Figure 5:
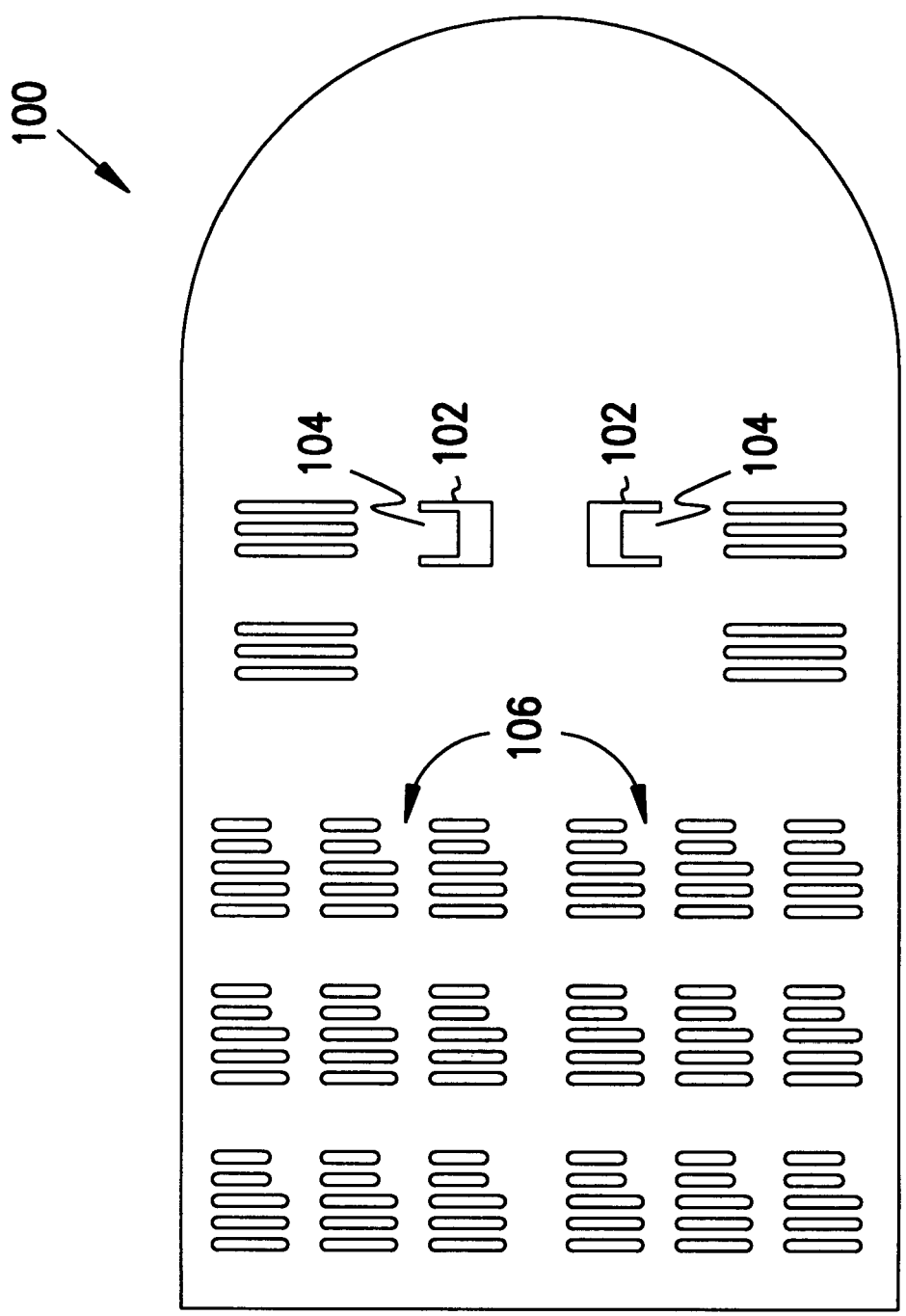
FIG. 5 is top plan view illustrating a base plate of the battery charger constructed in accordance with one embodiment of the present invention.

The battery charger 10 also includes the base plate 100. As illustrated in FIG. 5, the base plate 100 has a shape which corresponds to the general shape of the second surface 32 of the main housing 20. In one embodiment, the base plate 100 is formed from steel, and can be stamped. Alternatively, the base plate 100 can be formed from other rigid materials. The base plate 100 has a pair of slots 102 disposed therein. A flange 104 is disposed within each of the slots 102. Each of the slots 102 are sized larger than each flange for receiving the attachment members 83 therethrough. The slots 102 and each flange 104 are positioned on the base plate 100 such that when assembled, the flats 86 of the attachment members 83 are aligned with the each flange 104. Each flange 104 is rigidly connected with the base plate 100 and is dimensioned to engage the flats 86 of each of the attachment members 83 when the battery charger 10 is assembled. In one embodiment, the base plate 100 is provided with ventilation apertures 106 to facilitate heat dissipation.

To assemble the battery charger 10, contacts 50 are assembled to adapter 60 as previously discussed. The adapter 60 is inserted into the cut out 36 of the main housing 20. The mounting ribs 68 of the adapter 60 are seated within the seating cut outs 38 of the main housing. The base plate 100 is placed over the attachment members of the adapter 60 such that the resilient arms 84 align with the slots 102 of the base plate. The flats 86 of the attachment members 83 are seated with the flange 104 of the base plate 100, providing a secure assembly of the battery charger 10. The disposition of the attachment members 83 allow for removal of a device to be charged by the battery charger without complete disassembly of the battery charger 10. A further benefit is that repeated insertion and removal of a device to be charged by the battery charger will not result in the inadvertent disassembly of the battery charger. It should be noted that the order of assembly of the battery charger 10 is not limited to the order of the steps listed above.

Advantageously, the modular nature of the adapters allow for use of the battery charger 10 with future components of varying sizes. The multiple levels of the adapter 60 facilitate the use of single charging device for multiple electronic components of varying sizes. Further, the ventilation apertures throughout the battery charger permit efficient dissipation of heat from the battery charger 10. Another benefit of the battery charger 10 are the integral attachment members, which help prevent parts from becoming displaced, and are easy to manipulate for disassembly of the battery charger 10.

It is to be understood that the above description is intended to be illustrative, and not restrictive. Many other embodiments will be apparent to those of skill in the art upon reviewing the above description. The scope of the invention should, therefore, be determined with reference to the appended claim, along with the full scope of equivalents to which such claims will be entitled.

What is claimed is:

1. A battery charger comprising:
   a main housing having a housing cut out therein,
   an adapter removably disposed within the housing cut out and adapted to receive batteries therein, the adapter having at least a first level and a second level;
   the first level having a first set of apertures therein, the first level for receiving a first battery therein;
   the second level having a second set of apertures therein, the second level for receiving a second battery therein;
   a plurality of contacts disposed through the first and second set of apertures, the plurality of contacts being operatively coupled with a charging assembly; and
   a base plate coupled with the adapter, the base plate having ventilation apertures therein.

2. The battery charger as recited in claim 1, wherein the plurality of contacts are coupled with the adapter.

3. The battery charger as recited in claim 1, the adapter further comprising a first set of alignment projections.

4. The battery charger as recited in claim 1, wherein the first set of alignment projections are disposed on the first level of the adapter.

5. The battery charger as recited in claim 1, the adapter further comprising a second set of alignment projections.

6. The battery charger as recited in claim 1, wherein the second set of alignment projections are disposed on the first level of the adapter.

7. The battery charger as recited in claim 1, wherein the second level is adapted to receive smaller batteries than the first level.

8. The battery charger as recited in claim 1, wherein the main housing has at least one seating cut out therein.

9. The battery charger as recited in claim 8, wherein the adapter has at least one mounting rib, the mounting rib adapted to be received by the seating cut out when the adapter is coupled with the main housing.

10. The battery charger as recited in claim 1, further comprising at least one attachment member coupled with the adapter.

11. The battery charger as recited in claim 10, wherein at least one attachment member comprises a resilient arm.

12. The battery charger as recited in claim 11, wherein the resilient arm has an L-shape.

13. The battery charger as recited in claim 11, wherein the resilient arm engages at least a portion of the base plate.

14. The battery charger as recited in claim 1, wherein the contacts each comprise a multiple bend structure.

15. The battery charger as recited in claim 2, wherein the contacts are coupled to the adapter with a heat stake.

16. The battery charger as recited in claim 1, wherein the base plate is formed of a stamped metal material.

17. A battery charger comprising:

a main housing having a housing cut out therein, the main housing having at least one seating cut out therein;

an adapter removably disposed within the housing cut out and adapted to receive batteries therein, the adapter having at least a first level and a second level;

at least one resilient arm coupled with the adapter;

a mounting rib disposed on the adapter, the mounting rib being adapted to be received by the seating cut out when the adapter is coupled with the main housing;

the first level having a first set of apertures therein, the first level for receiving a first battery therein;

a first set of alignment projections being disposed on the first level of the adapter;

a second set of alignment projections being disposed on the first level of the adapter the second level having a second set of apertures therein, the second level for receiving a second battery therein;

a plurality of contacts disposed through the first and second set of apertures, the plurality of contacts being operatively coupled with a charging assembly and coupled with the adapter, each contact comprising a multiple bend structure; and a base plate coupled with the adapter such that the resilient arm engages at least a portion of the base plate, the base plate having ventilation apertures therein.

* * * * *